United States Patent [19]
Bonta

[11] Patent Number: 6,108,549
[45] Date of Patent: Aug. 22, 2000

[54] METHOD AND APPARATUS FOR PASSING NETWORK DEVICE OPERATIONS BETWEEN NETWORK DEVICES

[75] Inventor: Jeffrey D. Bonta, Arlington Heights, Ill.

[73] Assignee: Motorola, Inc., Schaumburg, Ill.

[21] Appl. No.: 08/999,799

[22] Filed: Aug. 12, 1997

Related U.S. Application Data

[63] Continuation of application No. 08/558,551, Nov. 16, 1995, abandoned, which is a continuation of application No. 08/123,615, Sep. 17, 1993, abandoned.

[51] Int. Cl.[7] .................................................. H04Q 7/38
[52] U.S. Cl. ...................... 455/446; 455/433; 370/95.3; 370/95.1; 370/79; 370/94.1; 379/21
[58] Field of Search .......................... 455/72, 446, 433, 455/456; 370/95.3, 95.1, 79, 94.1; 379/21

[56] References Cited

U.S. PATENT DOCUMENTS

| | | | |
|---|---|---|---|
| 5,111,454 | 5/1992 | Hung et al. ............................ | 370/95.3 |
| 5,136,584 | 8/1992 | Hedlund ................................ | 370/94.1 |
| 5,146,609 | 9/1992 | Tayloe et al. ......................... | 455/33.2 |
| 5,168,498 | 12/1992 | Adams et al. ........................ | 370/95.1 |
| 5,228,029 | 7/1993 | Kotzin ................................... | 370/95.1 |
| 5,305,308 | 4/1994 | English et al. ....................... | 370/32.1 |
| 5,361,399 | 11/1994 | Linquist et al. ...................... | 455/56.1 |
| 5,386,456 | 1/1995 | Schatz et al. . | |
| 5,398,276 | 3/1995 | Lemk et al. ........................... | 379/21 |
| 5,438,569 | 8/1995 | Kapadia et al. ....................... | 370/79 |
| 5,479,483 | 12/1995 | Furuya et al. ........................ | 455/433 |
| 5,526,397 | 6/1996 | Lohman ................................ | 379/58 |
| 5,533,028 | 7/1996 | Hita De La Torre et al. ........ | 455/446 |
| 5,555,260 | 9/1996 | Rinnback et al. .................... | 455/72 |

FOREIGN PATENT DOCUMENTS 0536544   4/1993   European Pat. Off. ................. 379/58

*Primary Examiner*—William Cumming
*Attorney, Agent, or Firm*—Kenneth A. Haas

[57] ABSTRACT

A method and apparatus for passing network device operations between a source and a target network device which are associated with a mobile communication unit in a radio communication system is provided. This passing of network device operations is accomplished by converting a first form of information to a second form in the source network device. Subsequently, the source and the target network device are notified that operations associated with the mobile communication unit will be passed at a particular time. At that particular time the information converting is bypassed such that the first form of information is provided to the target network device. In addition, the target network device begins to monitor incoming information for the first form of incoming information. In response to a presence of the first form of incoming information at the target network device, the first form of information is converted into the second form in the target network device.

6 Claims, 4 Drawing Sheets

METHOD AND APPARATUS FOR PASSING NETWORK DEVICE OPERATIONS BETWEEN NETWORK DEVICES

This is a continuation of application Ser. No. 08/588,551, filed Nov. 16, 1995 and now abandoned, which is a continuation of application Ser. No. 08/123,615, filed Sep. 17, 1993 and now abandoned.

FIELD OF THE INVENTION

The present invention relates to communication systems having a plurality of network devices and, more particularly, to a method and apparatus for passing network device operations between network devices.

BACKGROUND OF THE INVENTION

The following description is directed for use in a direct sequence code division multiple access (DS-CDMA) communication system. One such DS-CDMA system is described in the communication standard known as IS-95 or "Mobile Station-Base Station Compatibility Standard for Dual-Mode Wideband Spread Spectrum Cellular System and published by the Electronic Industries Association (EIA), 2001 Eye Street, N.W., Washington, D.C. 20006. However, it will be appreciated by those skilled in the art that the principles taught herein can readily be extended to other types of communication systems including but not limited to frequency division multiple access (FDMA) and time division multiple access (TDMA) communication systems.

Referring now to FIG. 2, because DS-CDMA cellular communication system equipment typically has an inherent limit on the number of ports that can be supported by each transcoder/selection system entity (XC), seams 200 form between the cells (e.g., cell 1 and cell 4) supported by different transcoder/selection entities (e.g., XC system A and B, respectively). One method to overcome the seam 200 utilizes a hard handoff instead of soft handoff (i.e., the soft handoff technique described in IS-95). In a hard handoff, a mobile communication unit is instructed to change to a completely new set of pilot channels which implies that no diversity selection function can be accomplished during the transition from the old transcoder/selection entity to the new one. Proprietary methods may be available to permit a smooth soft handoff transition across the seam 200 followed by a source to target transcoder/selection entity transition. It will be appreciated by those skilled in the art that the source and target transcoder may be located proximate one another in a central site location scheme or remotely located from one another in a distributed site location scheme. Whenever a transition is made (i.e., the source cell drops out of a soft handoff connection), "ownership" of the call is passed on to one of the target cells' controller and associated transcoding/selection entity. The target cell's controller receiving the ownership then becomes the source cell controller, and makes all subsequent decisions regarding soft handoff till it drops out. However, proprietary methods tend to rely on a particular system architecture to be used. In addition, proprietary methods do not tend to conform to open interface standards such as the Motorola proposed "A+ interface" or other communication protocol standards such as IS-41 published by the Electronic Industries Association (EIA), 2001 Eye Street, N.W., Washington, D.C. 20006. Therefore, a need exists for a method of overcoming transcoder seam 200 problems which may be used in open interface standards.

SUMMARY OF THE INVENTION

In a radio communication system having a source and a target transcoder and a mobile communication unit entering a particular communication mode, a method and apparatus for passing transcoder operations between the source and the target transcoder which are associated with the mobile communication unit is provided. This is accomplished by converting downlink information from the target transcoder from a first type of information to a second type of information and converting uplink information to the target transcoder from a second type of information to a first type of information, at the source transcoder. In addition, a particular time to pass the transcoder operations associated with the mobile communication unit is determined between the source and the target transcoder. Subsequently, the source and the target transcoder are notified of the particular time to pass the transcoder operations. Once notified, the downlink information converting step is bypassed such that downlink information of a first type from the source transcoder is provided to the target transcoder, at the particular time. Also, uplink information is converted at the target transcoder from the second type of information to the first type of information, at the particular time. In addition, uplink information is monitored of the second type for a transition to the first type of uplink information, beginning at the particular time at the source transcoder. In response to the transition to the first type of uplink information at the source transcoder, the uplink information converting step is bypassed such that uplink information of the first type from the target transcoder is not converted. Further, downlink information of the second type is monitored for a transition to the first type of downlink information, beginning at the particular time at the target transcoder. In response to the transition, the downlink information is converted from the first type to the second type at the target transcoder.

DETAILED DESCRIPTION

Figure 1:
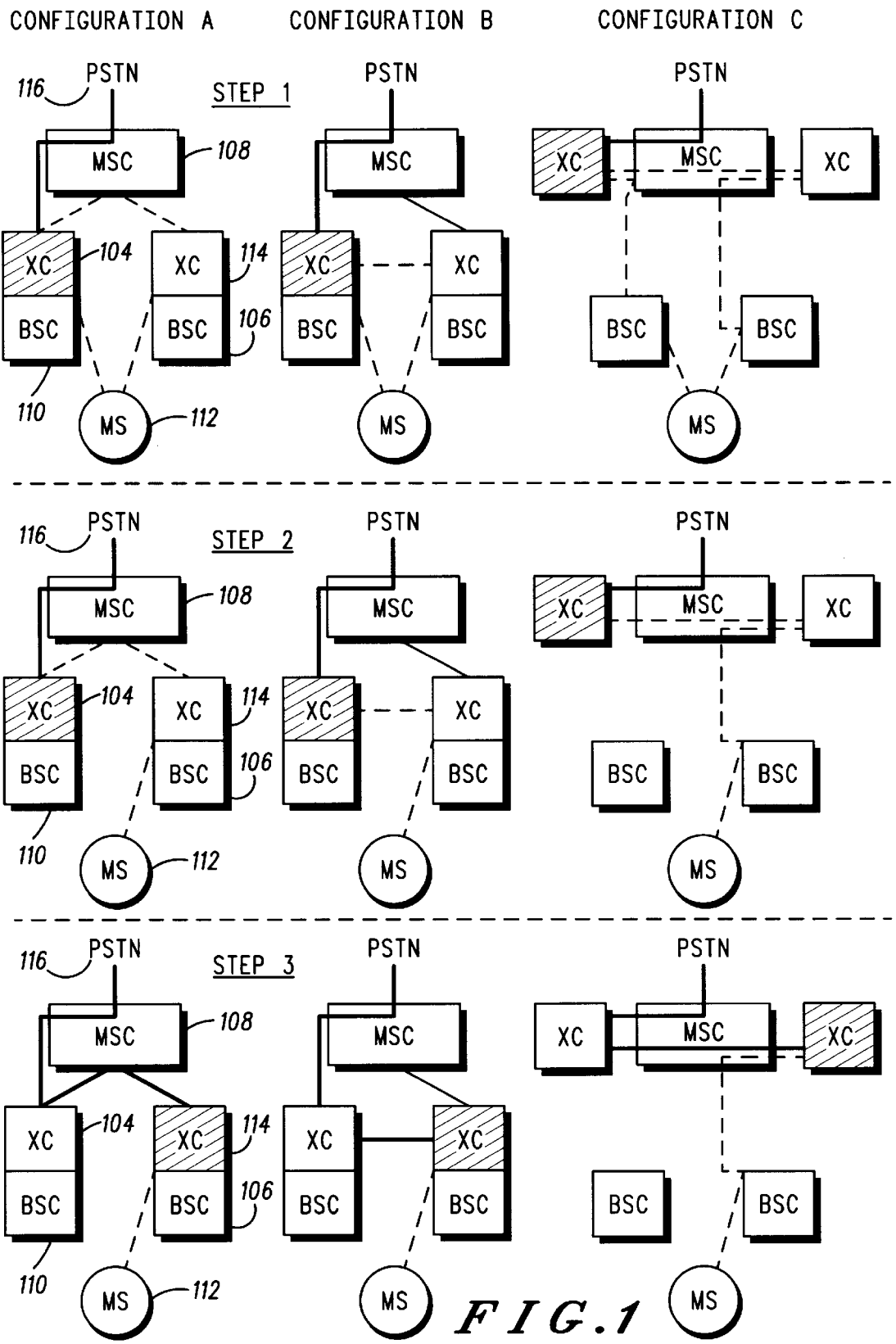
FIGS. 1A, 1B and 1C are block diagram representations showing three alternative preferred embodiment communication system network device configurations in accordance with the present invention.
Figure 2:
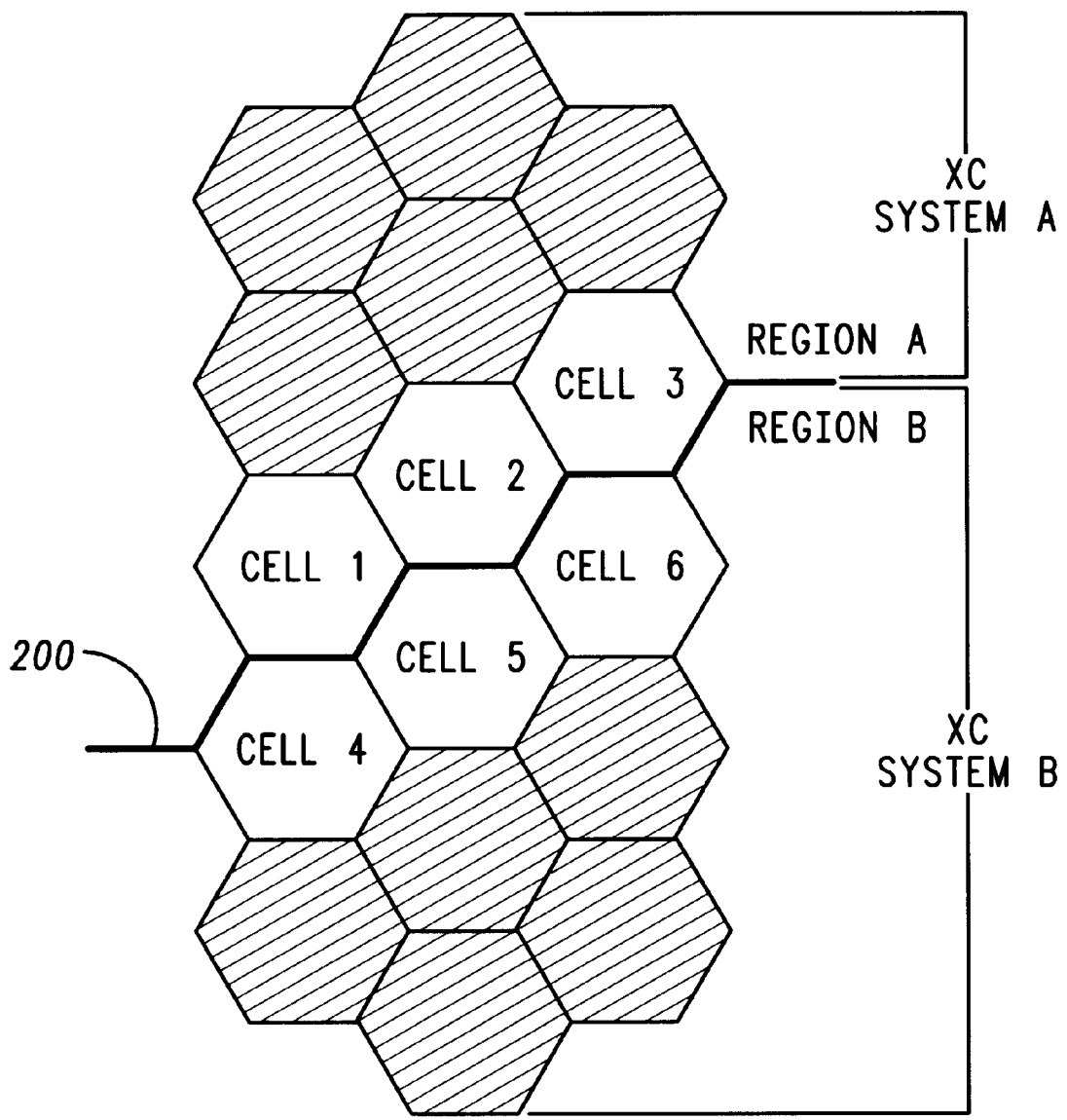
FIG. 2 is a cellular coverage diagram for a communication system operating in accordance with any of the alternative preferred embodiments shown in FIG. 1A–1C.

Shown in FIGS. 1A–1C are three alternative preferred embodiment communication system network device configurations in accordance with the present invention. The transcoder/selection entity (i.e., a network device) is a key component to a DS-CDMA system, and as such, vendors are all interested in supplying this equipment imbedded in their own system architecture. It is assumed that the likely architectures (e.g., configurations A, B, and C) will have this equipment either physically adjunct to the mobile switching center (MSC) (e.g., transcoder 100), or physically located between the base site controller (BSC) and the MSC (e.g., transcoders 102 and 104). However, logically, this equipment function is controlled by the BSC. Further, a specific transcoder/selection entity cannot be controlled by more than one BSC. Throughout the following description references to a source BSC refer to the BSC that is controlling the active transcoder/selection entity. It can be said then, that the source BSC has ownership of the call which means that its transcoder/selection entity is the controlling point for all BSC to mobile communications (e.g., handoff control). Ownership of a call may remain with the source BSC until there are no more pilot channels under its domain that the mobile wishes to keep in its active or candidate control channel set. At an appropriate time, the source transcoder will attempt to pass ownership to a target cell in a target BSC chosen by the source BSC.

The underlying purpose of the following method for passing "call" ownership between transcoders is to provide a better, less restrictive algorithm than the prior art to support a variety of system configurations, and to do it in a way that it can be described and included in an open standard interface specification (i.e., the "A+ interface"). Three possible configurations are shown FIG. 1A–1C which illustrate the progression of steps for each configuration necessary to move and redefine the usage of transcoder/selection entities involved in the "call" and of the terrestrial circuits which carry speech traffic for all channels involved in the call. FIGS. 1A and 1B illustrate the transcording/selection entity 102 or 104 physically between the BSC and MSC. FIG. 1C illustrates the transcoding/selection entity 100 physically adjunct to the MSC. In all configurations, the transcoding/selection entity is logically controlled by the BSC. FIGS. 1A–1C show several steps during the transition from the source transcoding/selection entity to the target transcoding selection entity. These steps evolve as a result of the action taken during this procedure.

An overview of the procedure is described as follows. In step 1, the source BSC 110 drops the last cell under its domain from the soft handoff connection via an internal soft handoff drop procedure, recognizes that the remaining cells in the soft handoff connection are under the target BSC 106, and determines that a drop source procedure is appropriate. At the conclusion of this step, the source transcoder/selection entity 104 is no longer listening/selecting the source channel. In Step 2 the source BSC 110 selects a transition time to move the ownership of the call and transcoder/selection control of the mobile connection to the target BSC 106. The source BSC 110 sends a Soft Handoff Drop Source message to the target BSC 110 via the MSC 108 containing a Circuit Identity Code of the existing soft handoff connection circuit, which will be used as a PCM bypass circuit to temporarily convey PCM between the source 104 and the target 114 transcoder, and a Transcoder Handoff Time for the transition. If the target BSC 106 accepts ownership and chooses to continue the soft handoff connection, then it will send a Handoff Acknowledge message to the MSC 108. This Transcoder Handoff Time is determined based on the maximum network delay to deliver the Transcoder Switchover Time to the target transcoder/selection entity 114. Delivery of the Transcoder Switchover Time could be in-band (like a proprietary solution) or out-of-band within an "A+ interface" protocol, but out-of-band offers the most system independent solution. A minimum delay time may need to be a recent changeable parameter used in determining an appropriate Transcoder Switchover Time since manufacturer delays within the communication system may be different. The transition time is conveyed to the source transcoder/selection entity 104. The target BSC 106 also conveys this transition time to the target transcoder/selection entity 114. The MSC 108 will reserve a target-PSTN terrestrial circuit to the target BSC 106 to subsequently connect the PSTN 116 connection to. Typically, this will be the target side of the existing soft handoff circuit. Thus the target side of the PCM bypass circuit and the circuit reserved by the MSC 108 for the target-PSTN connection are typically the same. In step 3, the Transcoder Hand-off Time has arrived, and the transition of ownership has occurred. However, the source transcoder/selection entity 104 is still physically a part of the existing call, because it conveys PCM between the MSC 108 and the target BSC 106 over the PCM bypass circuit. At this time, a Handoff Complete message is sent from the target BSC to the MSC signalling that the source transcoder/selection entity can now be dropped from the call.

Prior to sending the Handoff Complete (for Configuration B only), it may be necessary for the target BSC 106 to connect a third party conference (TPC) between the downlink path of the MSC 108 target BSC 106 terrestrial circuit, the downlink transit trunk from the source BSC 110, and the pre-transcoded downlink path to the mobile station 112. The downlink path from the MSC has idle pulse coded modulation (PCM) on it while the downlink path from the source has PCM from the public switched telephone network 116 (PSTN). PCM is broadcast uplink to the MSC 108 and the source BSC 110.

In a step 4 (not shown), the MSC 108 switches the PSTN 116 connection from the source terrestrial circuit to the target terrestrial circuit. The MSC 108 sends Clear Command messages to the source BSC 110 and target BSC 106 as necessary to instruct the source BSC 110 and target BSC 106 to release specific unused terrestrial resources. The transition is now complete with the source transcoder/selection entity 104 removed. The TPC at the target BSC 106 (in configuration B) may also be released after a delay, rather than in response to a message.

Figure 4:
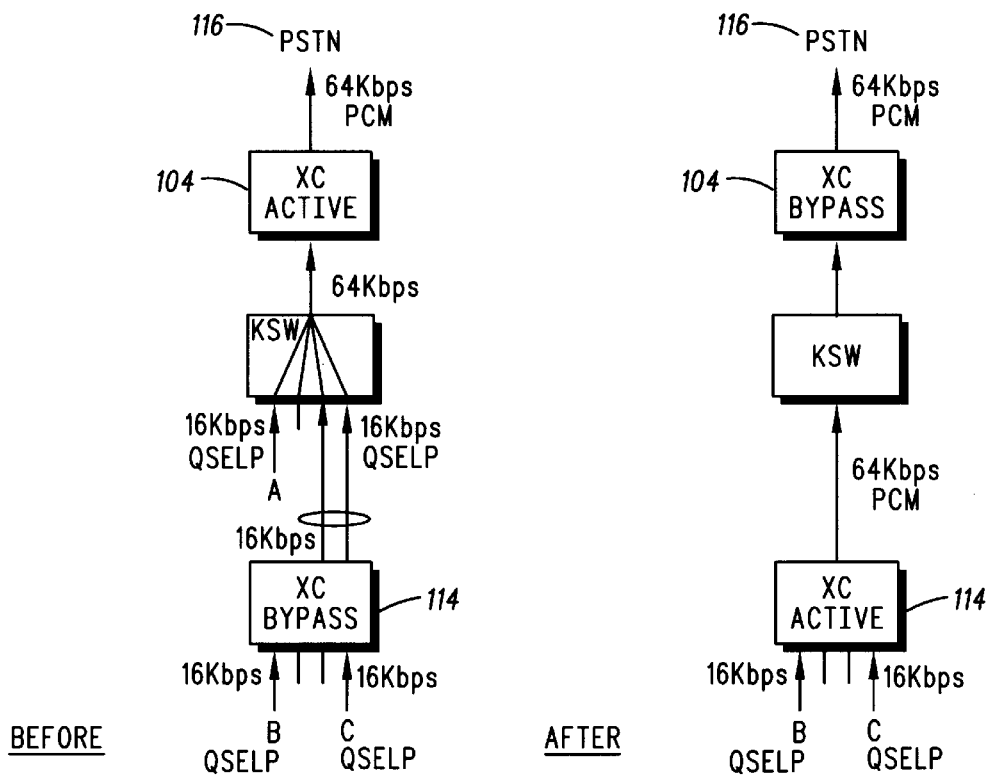
FIG. 4 is a block diagram showing an example uplink operation of a communication system in accordance with any of the alternative preferred embodiments shown in FIG. 1A–1C.

Between steps 2 and 3, the Transcoder Switchover Time arrives, and several actions have to take place to transfer the "call" ownership. First note that the transcoder 104 and 114 are required to have system time available to it. When the Transcoder Switchover Time occurs, the source transcoder/selection entity 104 awaits the next 20 milliseconds (msec) Qualcomm code excitation linear prediction (QCELP) frame boundary (i.e., a type of speech coding frame used in IS-95), and at that time, the source transcoder 104 immediately bypasses downlink PCM on to the target transcoder 114. On the uplink side, the source transcoder 104 must monitor the incoming information bit stream for a predetermined period of time or until the source transcoder 104 recognizes the transition from QCELP frames to PCM samples, and at that time stop the uplink transcoding process from QCELP to PCM, thereby bypassing uplink PCM directly to the PSTN 116. This time of transition for uplink transcoding requires the source transcoder 104 to switch from 1, 2 or 3 incoming 16 kilobits per second (Kbps) paths to a single incoming 64 Kbps path. The 16 Kbps paths may or may not be sub-rate paths. FIG. 4 illustrates some of the source BSC requirements for a transition.

Figure 3:
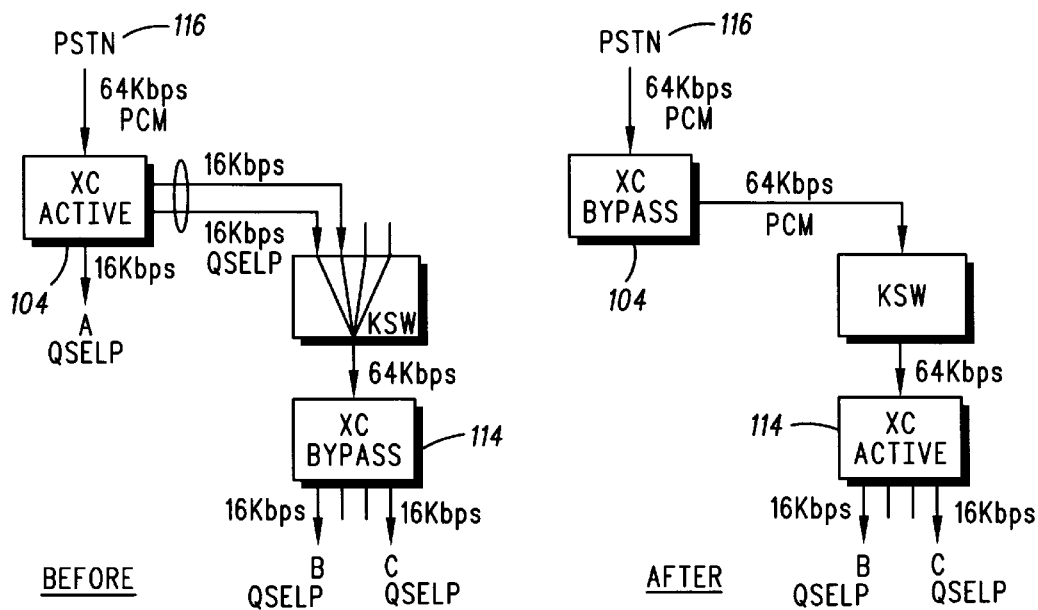
FIG. 3 is a block diagram showing an example downlink operation of a communication system in accordance with any of the alternative preferred embodiments shown in FIG. 1A–1C.

When the Transcoder Switchover Time occurs, the target transcoder/selection entity 114 awaits the next 20 msec QCELP frame boundary, and at that time, the target transcoder 114 immediately transcodes the uplink QCELP to PCM. On the downlink side, the transcoder 114 must monitor the bit stream for a predetermined period of time or until the transcoder 114 recognizes the transition from QCELP frames to PCM samples, and at that time begin the downlink transcoding process from PCM to QCELP to broadcast to each soft handoff connection for this "call". This time of transition for downlink transcoding requires the target transcoder to switch from 1, 2 or 3 incoming 16 Kbps paths to a single incoming 64 Kbps path. The 16 Kbps paths may or may not be sub-rate paths. FIG. 3 illustrates this requirement.

Through the above described procedures a method is provided for maintaining a soft handoff transition across a seam with an architecturally independent transition of "call" ownership (i.e., transition of "call" control from one transcoder/selection entity to another). The method utilizes existing handoff procedures available in IS-95 which in turn minimizes network signaling. In addition, the method lends itself to use in an open interface standard (e.g., the "A+ interface"), because it is an architecturally independent method. It will be appreciated that network devices can also be configured in view of the above described method.

Figure 5:
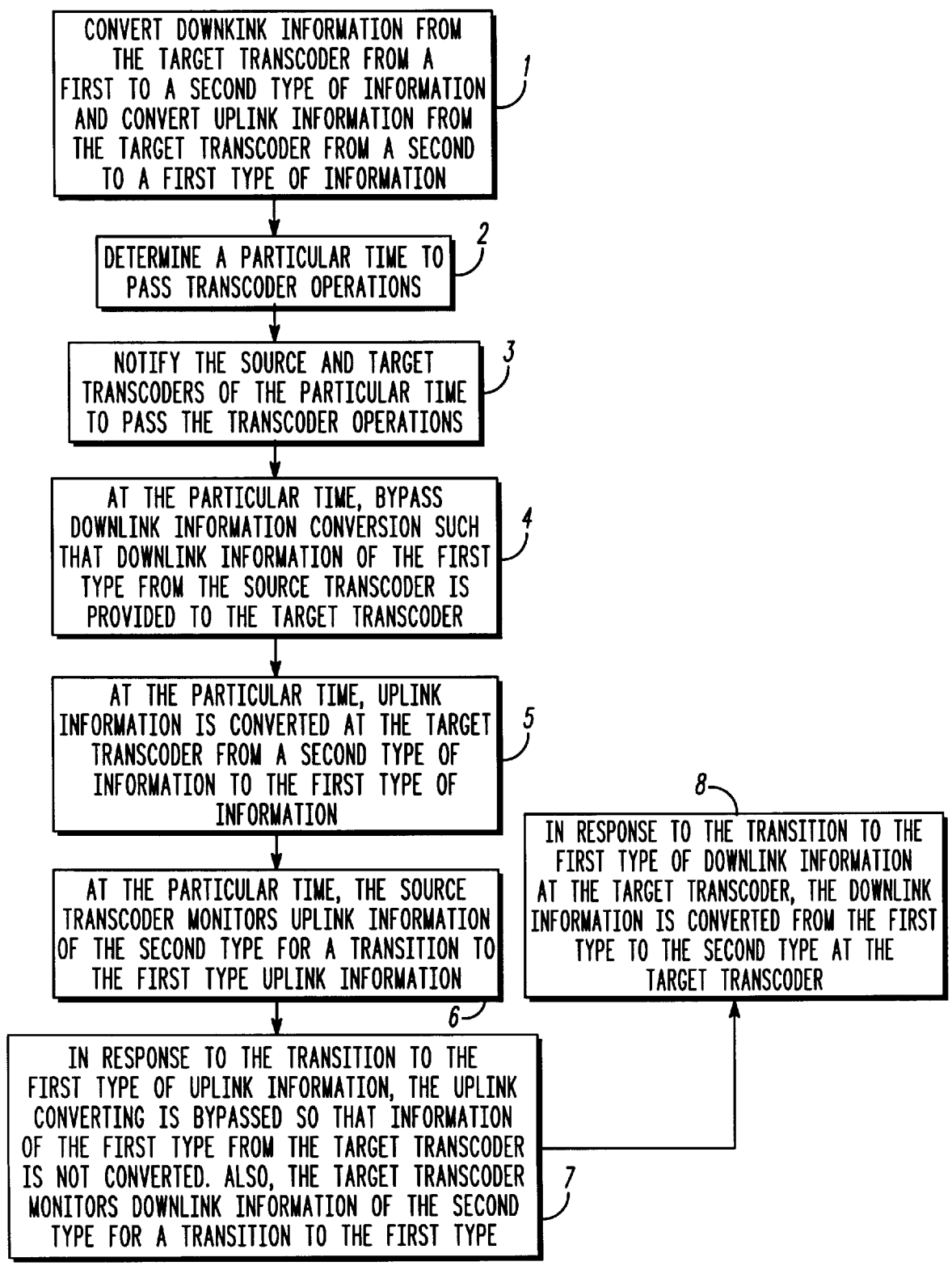
FIG. 5 is a flow chart illustrating operation of a communication system in accordance with the preferred embodiment of the present invention.

The principles described herein can be summarized as follows and as illustrated in FIG. 5. In a radio communication system having a source 104 and a target 114 transcoder and a mobile communication unit 112 entering a particular communication mode, a method for passing transcoder operations between the source 104 and the target transcoder 114 which are associated with the mobile communication unit 112 is provided. This passing of transcoder operations begins at step 1 with converting downlink information from the target transcoder 104 to a first type of information (PCM) to a second type of information (QCELP) and converting uplink information from the target transcoder 104 from a second type of information (QCELP) to a first type of information (PCM), at the source transcoder 104. Also, at step 2 a particular time to pass the transcoder operations associated with the mobile communication unit 112 between the source 104 and the target 114 transcoder is determined. The source 104 and the target 114 transcoder are notified of the particular time to pass the transcoder operations (step 3). At the particular time, the downlink information converting is bypassed such that downlink information of a first type (PCM) from the source transcoder 104 is provided to the target transcoder 114 (step 4). In addition, at the particular time, uplink information is converted at the target transcoder 114 from the second type (QCELP) of information to the first type of information (PCM) (step 5). Also, beginning at the particular time, the source transcoder 104 monitors uplink information of the second type (QCELP) for a transition to the first type of uplink information (PCM) (step 6). In response to the transition to the first type of uplink information (PCM) at the source transcoder 104, the uplink information converting is bypassed such that uplink information of the first type (PCM) from the target transcoder 114 is not converted (step 7). Further, beginning at the particular time, the target transcoder 114 monitors downlink information of the second type (QCELP) for a transition to the first type (PCM) of downlink information (step 7). In response to the transition to the first type (PCM) of downlink information at the target transcoder 114, the downlink information is converted from the first type (PCM) to the second type (QCELP) at the target transcoder 114 (step 8).

These steps of passing transcoder operations are accomplished through a logical connection between the source 104 and the target 114 transcoder. The logical connection may be formed by an operative coupling between at least two of the following system entities including: the source transcoder, the target transcoder, a first mobility manager, a second mobility manager, a first base site controller, a second base site controller, a first communication switch, a second communication switch, and a public switched telephone network.

The method of passing transcoder operations may also include passing control information to the target transcoder 114 which indicates that the target transcoder 114 should take over communications with the mobile communication unit 112. In response to the target transcoder 114 receiving control information to take over communications with the mobile communication unit 112, the source transcoder 104 is released from communications with the mobile communication unit 112.

Similarly, the method of passing transcoder operations may also include passing control information to the source transcoder 104 which indicates that the source transcoder 104 should maintain communications with the mobile communication unit 112. In response to the source transcoder 104 receiving control information to maintain communications with the mobile communication unit 112, the target transcoder 114 is left in its original state of operation (e.g., in a bypass mode) of communications with the mobile communication unit.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the network device operations have been described in the context of a transcoder hand over operation. However, it will be appreciated by those skilled in the art that the present invention teachings can be readily adapted for use with other types of network device operations such as diversity combining and communication link encryption processes. In addition, the source and target network devices may be devices other than a transcoder such as a mobility manager, a base site controller, a communication network switch, or a location register. Finally, the radio communication channel could alternatively be an electronic data bus, wireline, optical fiber link, satellite link, or any other type of communication channel.

What is claimed is:

1. In a radio communication system having a source and a target transcoder and a mobile communication unit entering a particular communication mode, a method for passing transcoder operations between the source and the target transcoder, the transcoder operations associated with the mobile communication unit, comprising:

(a) converting downlink information at the source transcoder from a first type of information to a second type of information;

(b) determining a particular time to pass the transcoder operations associated with the mobile communication unit between the source and the target transcoder;

(c) notifying the source and the target transcoder of the particular time to pass the transcoder operations;

(d) bypassing the downlink information converting step at the source transcoder to provide downlink information of the first type from the source transcoder to the target transcoder, beginning at the particular time;

(e) converting uplink information at the target transcoder from the second type of information to the first type of information, beginning at the particular time;

(f) at the source transcoder, monitoring uplink information from the target transcoder for a transition to the first type of uplink information, beginning at the particular time;

(g) at the source transcoder bypassing the uplink information converting step, in response to detecting the transition to the first type of uplink information, to inhibit conversion of uplink information of the first type from the target transcoder;

(h) at the target transcoder, monitoring downlink information from the source transcoder for a transition to the first type of downlink information, beginning at the particular time; and (i) converting the downlink information from the first type to the second type at the target transcoder, in response to detecting the transition to the first type of downlink information at the target transcoder.

2. The method of claim 1 wherein the steps of monitoring comprise performing an algorithm selected from the group consisting of: detecting a change in the content of the information and monitoring for a time out event.

3. The method of claim 1 further comprising the step of establishing a logical connection between the source and the target transcoder by operatively coupling between at least two of the following system entities selected from the group consisting of the source transcoder, the target transcoder, a first base site controller, a second base site controller, a first communication switch, a second communication switch, and a public switched telephone network.

4. The method of claim 1 wherein the step of passing of transcoder operations occurs across regional entities.

5. The method of claim 1 further comprising the steps of:
(a) passing control information to the target transcoder indicating that the target transcoder is to take over communications with the mobile communication unit; and
(b) releasing the source transcoder from communication with the mobile communication unit, in response to the target transcoder receiving control information to take over communications with the mobile communication unit.

6. The method of claim 1 further comprising the steps of:
(a) passing control information to the source transcoder indicating that the source transcoder is to maintain communications with the mobile communication unit;
(b) leaving the target transcoder in an original state of communications with the mobile communication unit, in response to the source transcoder receiving control information to maintain communications with the mobile communication unit.

* * * * *

UNITED STATES PATENT AND TRADEMARK OFFICE
CERTIFICATE OF CORRECTION

PATENT NO : 6,108,549
DATED : August 22, 2000
INVENTOR(S) : Bonta

It is certified that error appears in the above-identified patent and that said Letters Patent are hereby corrected as shown below:

Column 7, line 5 reads "mation from the source transcoder for" and it should read --mation of the second type for--.

Signed and Sealed this

Seventeenth Day of April, 2001

NICHOLAS P. GODICI

Attest:

Attesting Officer

Acting Director of the United States Patent and Trademark Office